US009680537B2

United States Patent
Inoue et al.

(10) Patent No.: US 9,680,537 B2
(45) Date of Patent: *Jun. 13, 2017

(54) RADIO BASE STATION, USER TERMINAL, RADIO COMMUNICATION SYSTEM AND RADIO COMMUNICATION METHOD

(75) Inventors: Yuki Inoue, Tokyo (JP); Tetsushi Abe, Tokyo (JP)

(73) Assignee: NTT DOCOMO , INC., Tokyo (JP)

( * ) Notice: Subject to any disclaimer, the term of this patent is extended or adjusted under 35 U.S.C. 154(b) by 171 days.

This patent is subject to a terminal disclaimer.

(21) Appl. No.: 14/238,273

(22) PCT Filed: Aug. 14, 2012

(86) PCT No.: PCT/JP2012/070695
§ 371 (c)(1),
(2), (4) Date: Feb. 11, 2014

(87) PCT Pub. No.: WO2013/024852
PCT Pub. Date: Feb. 21, 2013

(65) Prior Publication Data
US 2014/0211731 A1    Jul. 31, 2014

(30) Foreign Application Priority Data
Aug. 15, 2011    (JP) ................................. 2011-177604

(51) Int. Cl.
*H04L 5/00*    (2006.01)
*H04B 7/06*    (2006.01)
(Continued)

(52) U.S. Cl.
CPC ......... *H04B 7/0417* (2013.01); *H04B 7/0456* (2013.01); *H04B 7/063* (2013.01);
(Continued)

(58) Field of Classification Search
None
See application file for complete search history.

(56) References Cited

U.S. PATENT DOCUMENTS

| 2009/0318157 A1 | 12/2009 | Hoshino et al. |
| 2010/0173639 A1* | 7/2010 | Li .................. H04B 7/0695 455/450 |

(Continued)

FOREIGN PATENT DOCUMENTS

| JP | 2010-233214 A | 10/2010 |
| WO | 2009/137092 A1 | 11/2009 |

OTHER PUBLICATIONS

Office Action issued in corresponding Japanese Application No. 2013-529020, mailed Jul. 22, 2014 (5 pages).
(Continued)

*Primary Examiner* — Candal Elpenord
*Assistant Examiner* — Adam Duda
(74) *Attorney, Agent, or Firm* — Osha Liang LLP

(57) ABSTRACT

The present invention is designed to reduce the increase in the amount of the calculation process in a mobile station and the amount of CSI feedback data, and also prevent the amount of overall system capacity from decreasing. This radio communication system (1) has a radio base station (200) which can form a plurality of beams that are vertically sectorized. The radio base station (200), using an array antenna (10), forms at least the first beam that is directed to the cell edge side and a second beam that is directed to the cell center side, in parallel. A mobile station (100) measures channel quality by extracting reference signals from each of the first beam and the second beam, generates a communication quality feedback signal including channel quality measured from at least one of the beams, and feeds this back to the radio base station (200) via the uplink.

7 Claims, 11 Drawing Sheets

(51) Int. Cl.
  *H04L 1/00*        (2006.01)
  *H04B 7/04*        (2017.01)
  *H04L 27/26*       (2006.01)
  *H04W 16/28*       (2009.01)
  *H04B 7/10*        (2017.01)
  *H04B 7/0417*      (2017.01)
  *H04B 7/0456*      (2017.01)

(52) U.S. Cl.
  CPC ......... *H04B 7/0617* (2013.01); *H04B 7/0626* (2013.01); *H04B 7/0632* (2013.01); *H04B 7/0639* (2013.01); *H04B 7/0695* (2013.01); *H04L 1/0026* (2013.01); *H04L 5/0057* (2013.01); *H04W 16/28* (2013.01); *H04B 7/10* (2013.01); *H04L 27/261* (2013.01)

(56) References Cited

U.S. PATENT DOCUMENTS

| | | | |
|---|---|---|---|
| 2010/0195527 A1* | 8/2010 | Gorokhov | H04B 7/0417 370/252 |
| 2010/0225552 A1 | 9/2010 | Shimizu et al. | |
| 2011/0065448 A1 | 3/2011 | Song et al. | |
| 2011/0103504 A1 | 5/2011 | Ma | |
| 2011/0164668 A1* | 7/2011 | Hoek | H04B 7/0619 375/224 |
| 2011/0205930 A1* | 8/2011 | Rahman | H04B 7/0417 370/252 |
| 2012/0058791 A1* | 3/2012 | Bhattad | H04L 1/0606 455/509 |

OTHER PUBLICATIONS

International Search Report for corresponding International Application No. PCT/JP212/070695, mailed Sep. 25, 2012 (4 pages).

3GPP TR 25.913 V8.0.0; "3rd Generation Partnership Project; Technical Specification Group Radio Access Network; Requirements for Evolved UTRA (E-UTRA) and Evolved UTRAN (E-UTRAN) (Release 8);" Dec. 2008 (18 pages).

Extended European Search Report Issued in Corresponding European Application No. 12823355.8, Dated Jan. 15, 2015 (10 Pages).

* cited by examiner

RADIO BASE STATION, USER TERMINAL, RADIO COMMUNICATION SYSTEM AND RADIO COMMUNICATION METHOD

TECHNICAL FIELD

The present invention relates to a radio base station, a user terminal, a radio communication system and a radio communication method that are applicable to a next-generation mobile communication system.

BACKGROUND ART

In a UMTS (Universal Mobile Telecommunications System) network, system features that are based on W-CDMA (Wideband Code Division Multiple Access) are maximized by adopting HSDPA (High Speed Downlink Packet Access) and HSUPA (High Speed Uplink Packet Access) for the purposes of improving the spectral efficiency and improving the data rate. For this UMTS network, long-term evolution (LTE) has been under study for the purposes of further increasing high-speed data rates, providing low delay and so on.

In the third-generation system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study as well (for example, LTE-Advanced (LTE-A)). For example, in LTE-A, there is a plan to expand the maximum system band according to LTE specifications, which is 20 MHz, to approximately 100 MHz.

Also, in a system of the LTE scheme, a MIMO (Multi Input Multi Output) system is proposed (see, for example, non-patent literature 1), as a radio communication technique to transmit and receive data by a plurality of antennas and improve the data rate (spectral efficiency). In the MIMO system, a plurality of transmitting/receiving antennas are provided in the transmitter/receiver, so that varying transmission information sequences are transmitted at the same time from different transmitting antennas. Meanwhile, on the receiver side, taking advantage of the fact that fading variation is produced differently between the transmitting/receiving antennas, it is possible to increase the data rate (spectral efficiency) by separating and detecting the information sequences that have been transmitted at the same time.

In a system of the LTE scheme, single-user MIMO (SU-MIMO) transmission, in which transmission information sequences that are transmitted from different transmitting antennas at the same time are all directed to the same user, and multiple-user MIMO (MU-MIMO) transmission, in which transmission information sequences that are transmitted from different transmitting antennas at the same time are directed to different users, are defined. In these SU-MIMO transmission and MU-MIMO transmission, on the receiver side, optimal PMIs are selected from a codebook, in which a plurality of amounts of phase/amplitude control (precoding matrix (precoding weights)) to be set in the antennas of the transmitter and PMIs (Precoding Matrix Indicators) that are associated with this precoding matrix, are defined, and these are fed back to the transmitter as channel information (CSI: Channel State Information). On the transmitter side, precoding for each transmitting antenna is performed based on the PMIs fed back from the receiver, and transmission information sequences are transmitted.

CITATION LIST

Non-Patent Literature

Non-Patent Literature 1: 3GPP TR 25.913 "Requirements for Evolved UTRA and Evolved UTRAN"

SUMMARY OF THE INVENTION

Technical Problem

Now, using user terminals that process reference signals (CSI-RSs) of the maximum number of MIMO multiplexing and feed back CSI makes it possible to realize communication in capacity to match the maximum number of MIMO multiplexing by controlling the antenna apparatus in systems of the LTE and LTE-A schemes.

However, the amount of the calculation process in user terminals and the amount of CSI feedback data increase exponentially in accordance with the number of MIMO multiplexing, and therefore there is a problem that a significant load of calculation processing increases the power consumption of user terminals and increases the amount of CSI feedback data.

The present invention has been made in view of the above, and it is therefore an object of the present invention to provide a radio base station, a user terminal, a radio communication system and a radio communication method that can reduce the increase in the amount of the calculation process in user terminals and the amount of CSI feedback data, and that can furthermore multiplex user terminals located on cell edges and near the center of cells and increase the capacity.

Solution to Problem

A radio communication system according to the present invention is a radio communication system having a radio base station that forms a cell and a user terminal that establishes wireless connection with the radio base station, and, in this radio communication system: the radio base station has: an array antenna that has a plurality of antenna elements aligned in one direction, the plurality of antenna elements being divided into a plurality of groups in the direction of the alignment of the elements; a precoding multiplication section configured to multiply signals to supply to the antenna elements, by each weight of precoding weights, per antenna element group; a precoding weight section configured to generate precoding weights by which the array antenna forms at least a first beam that is directed to a cell edge side and a second beam that is directed to a cell center side in parallel; and a mapping section configured to arrange different reference signals allocated respectively to the first beam and the second beam, in separate resources; and the user terminal has: a receiving section configured to receive the first beam and the second beam; a channel quality measurement section configured to extract the reference signals from each of the received first beam and second beam and measure channel quality; a feedback signal generating section configured to generate a communication quality feedback signal that includes the channel quality measured from at least one of the first and second beams;

and a transmission section configured to feed back the generated communication quality feedback signal to the radio base station via an uplink.

Technical Advantage of the Invention

According to the present invention, it is possible to reduce the increase in the amount of the calculation process in user terminals and the amount of CSI feedback data, and furthermore multiplex user terminals located on cell edges and near the center of cells and increase the capacity.

DESCRIPTION OF EMBODIMENTS

The radio communication system according to the present embodiment has a radio base station that can form a plurality of beams that are vertically sectorized, and user terminals that establish wireless connection in the cell formed by this radio base station. The radio base station has an array antenna that is formed with a plurality of antenna elements that are grouped into at least one group in association with each of N communication types, where N is an integer of 2 or more.

First, a plurality of types of communication provided by the above array antenna will be described.

Figure 1:
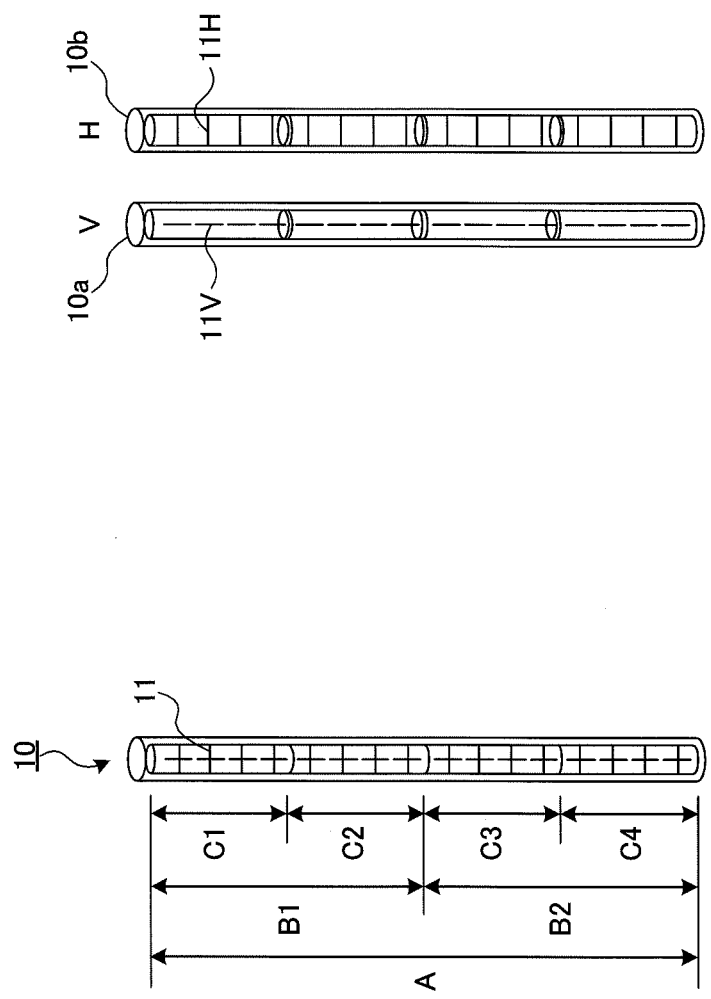
FIG. 1 provides conceptual diagrams of an array antenna constituting an antenna apparatus.

FIG. 1A is a conceptual diagram of an array antenna. As shown in FIG. 1A, an array antenna 10 is formed with a plurality of antenna elements 11 that are aligned in a line in one direction. In FIG. 1A, sixteen antenna elements 11 are shown as an example. With the present embodiment, the array antenna 10 is formed with a polarized antenna that combines a vertically polarized antenna 10a and a horizontally polarized antenna 10b. However, the present invention is by no means limited to a polarized antenna configuration. FIG. 1B is a conceptual diagram to show the vertically polarized antenna 10a alone, and FIG. 1C is a conceptual diagram to show the horizontally polarized antenna 10b alone. When a polarized antenna is adopted, the individual antenna elements 11 are each formed with a set of a vertically polarized element 11V and a horizontally polarized element 11H. Although a case will be described with the following description where the array antenna 10 of the radio base station is erected vertically, it is equally possible to arrange the array antenna 10 diagonally (or horizontally), depending on the environment.

The first communication type is a type to form one antenna branch with the whole antenna, by forming one group A with all of the antenna elements 11 constituting the array antenna 10. The second communication type is a type to form two antenna branches with the whole antenna, by forming two groups B1 and B2, which divide the array antenna 10 up and down, into two. The third communication type is a type to form four antenna branches, by forming four groups, C1, C2, C3 and C4, which divide the array antenna 10 up and down, into four. Although the first to third communication types will be shown as examples with the present embodiment, it is equally possible to set an arbitrary number of communication types as adequate, depending on the number of divisions of antenna elements 11 constituting the array antenna 10 in vertical directions. Also, the maximum number of branches can be selected as adequate, depending on the antenna elements 11.

Among the first to third communication types, the length of antennas to constitute one branch is the longest (the number of antenna elements is the largest) in the first communication type. The length of antennas per branch becomes shorter as the number of antenna branches increases (the number of antenna elements decreases). Generally speaking, when beams are formed using an array antenna, it is possible to improve the antenna gain and make the beam width smaller, as the number of antenna elements per branch increases. Consequently, according to the first communication type, the whole antenna is formed with one antenna branch, so that the antenna gain is maximized, and it is possible to form sharp beams that are directed toward cell edges. With the second communication type, the number of antenna elements per branch is half, so that, compared to the first communication type, the antenna gain decreases and furthermore the beam width becomes greater. With the third communication type, the number of antenna elements per branch decreases to ½ again from the second communication type, so that, compared to the second communication type, the antenna gain decreases and furthermore the beam width becomes greater.

The radio communication system according to the present embodiment is able to switch the branch configuration of the array antenna 10 based on precoding weights (hereinafter simply referred to as "weights"). Here, the configuration to switch the branch configuration of the array antenna 10 based on precoding weights will be described.

Figure 2:
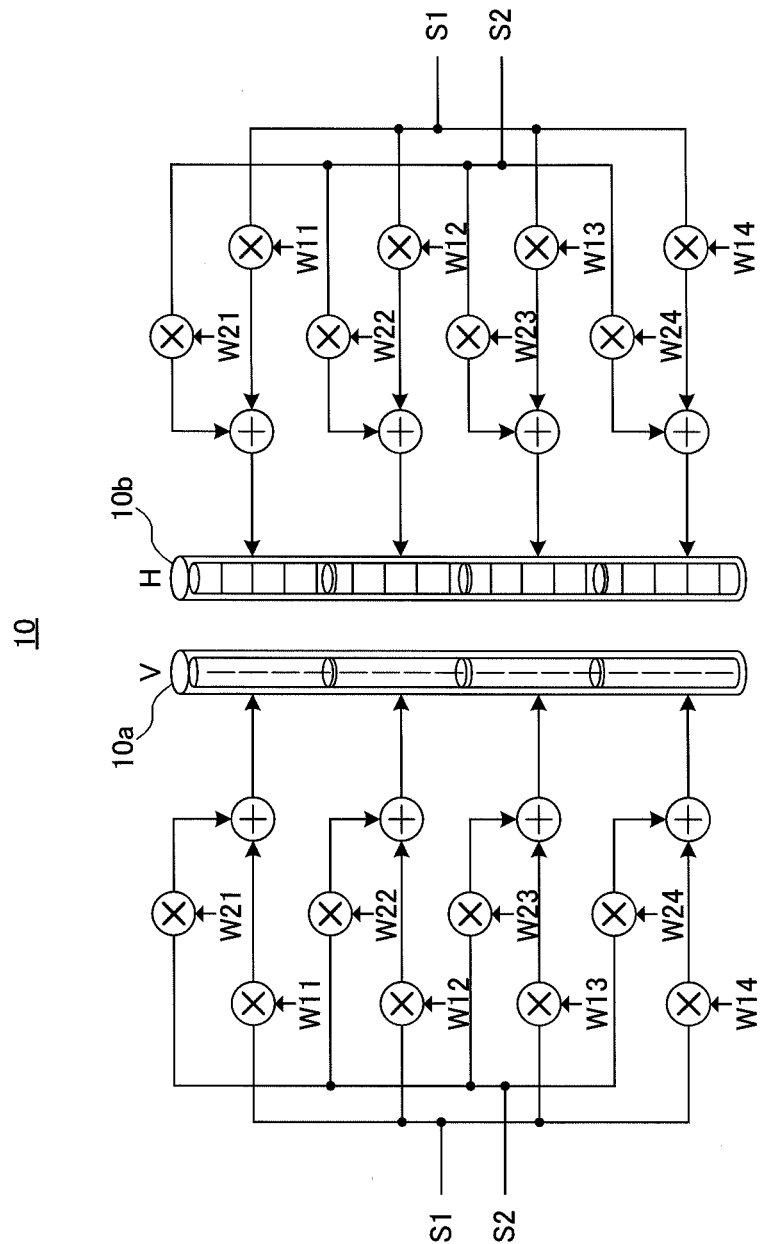
FIG. 2 is a diagram showing the relationship between groups of antenna elements of an array antenna and precoding weights.

In the array antenna 10, transmission signals that are multiplied by weights on a per group basis are input in the antenna elements 11. By controlling the weights, it is possible to form an arbitrary antenna branch with the array antenna 10. As shown in FIG. 2, transmission signals that are multiplied by the same weight in minimum antenna branch units (where the number of antenna elements is four) are supplied to the sixteen antenna elements 11 constituting the array antenna 10. Although a configuration which can combine two transmission signals S1 and S2 is shown in FIG. 2, the maximum number to be combined is not limited to this. For example, when providing eight-antenna port transmission, it is preferable to use a configuration which can combine four transmission signals S1, S2, S3 and S4. However, transmission signals S1, S2, S3 and S4 may be the same signal, and the branch configuration to be set in the array antenna 10 changes depending on the details of the weights by which transmission signals are multiplied.

In the first communication type, transmission signal S1, multiplied by the same weight W (for example, W11, W12, W13, W14=1, 1, 1, 1), is input in all the antenna elements 11 constituting one group A. By this means, it is possible to form one beam having the maximum antenna gain and having the minimum beam width. The vertically polarized antenna 10a and the horizontally polarized antenna 10b each form one beam, so that, with the antenna apparatus (array antenna 10), two beams are formed (see FIG. 5). Consequently, the first communication type can provide two-antenna port transmission. If the receiver supports 2×2 MIMO transmission, 2×2 MIMO transmission can be realized. Also, when the receiver is configured for one-antenna transmission, it is possible to realize two-antenna transmission and one-antenna reception, so that it is possible to provide space-frequency transmission diversity by SFBC (Space-Frequency Block Coding). In SFBC, coding is executed in the antenna/frequency domain.

With the second communication type, transmission signal S1, which makes only group B1 an active branch, is multiplied by weights (W11, W12, W13, W14)=(1, 1, 0, 0), and transmission signal S2, which makes only group B2 an active branch, is multiplied by weights (W11, W12, W13, W14)=(0, 0, 1, 1). As a result of that, in the antenna elements 11 constituting the array antenna 10, transmission signal S1, multiplied by weights (W11, W12)=(1, 1), which make the antenna elements 11 constituting group B1 active, and also multiplied by weights (W13, W14)=(0, 0), which make the antenna elements 11 constituting group B2 inactive, is input. At the same time, transmission signal S2, multiplied by weights (W11, W12)=(0, 0), which make the antenna elements 11 constituting group B1 inactive, and also multiplied by weights (W13, W14)=(1, 1), which make the antenna elements 11 constituting group B2 active, is input. By this means, it is possible to form beam 1 and beam 2 by two antenna branches corresponding to groups B1 and B2. The vertically polarized antenna 10a forms beam 1 and beam 2, and, at the same time, the horizontally polarized antenna 10b forms beam 3 and beam 4, so that the array antenna 10 is able to form total four beams in parallel (see FIG. 6). By directing the four beams that are formed in parallel toward the same area in a cell, four-antenna port transmission is provided. If the receiver supports 4×4 MIMO transmission, 4×4 MIMO transmission can be realized.

In the third communication type, the array antenna 10 is able to form four beams by changing the weight W per branch constituting groups C1, C2, C3 and C4. The vertically polarized antenna 10a forms four beams, and, at the same time, the horizontally polarized antenna 10b forms four beams, so that the array antenna 10 is able to form total eight beams in parallel. By directing the eight beams that are formed in parallel toward the same area in a cell, eight-antenna port transmission is provided.

(Signaling by Vertical Sectorization Beams)

Next, the vertical sectorization beam formation that is provided by the radio base station constituting the radio communication system of the present embodiment, and signaling using vertical sectorization beams, will be described.

Figure 3:
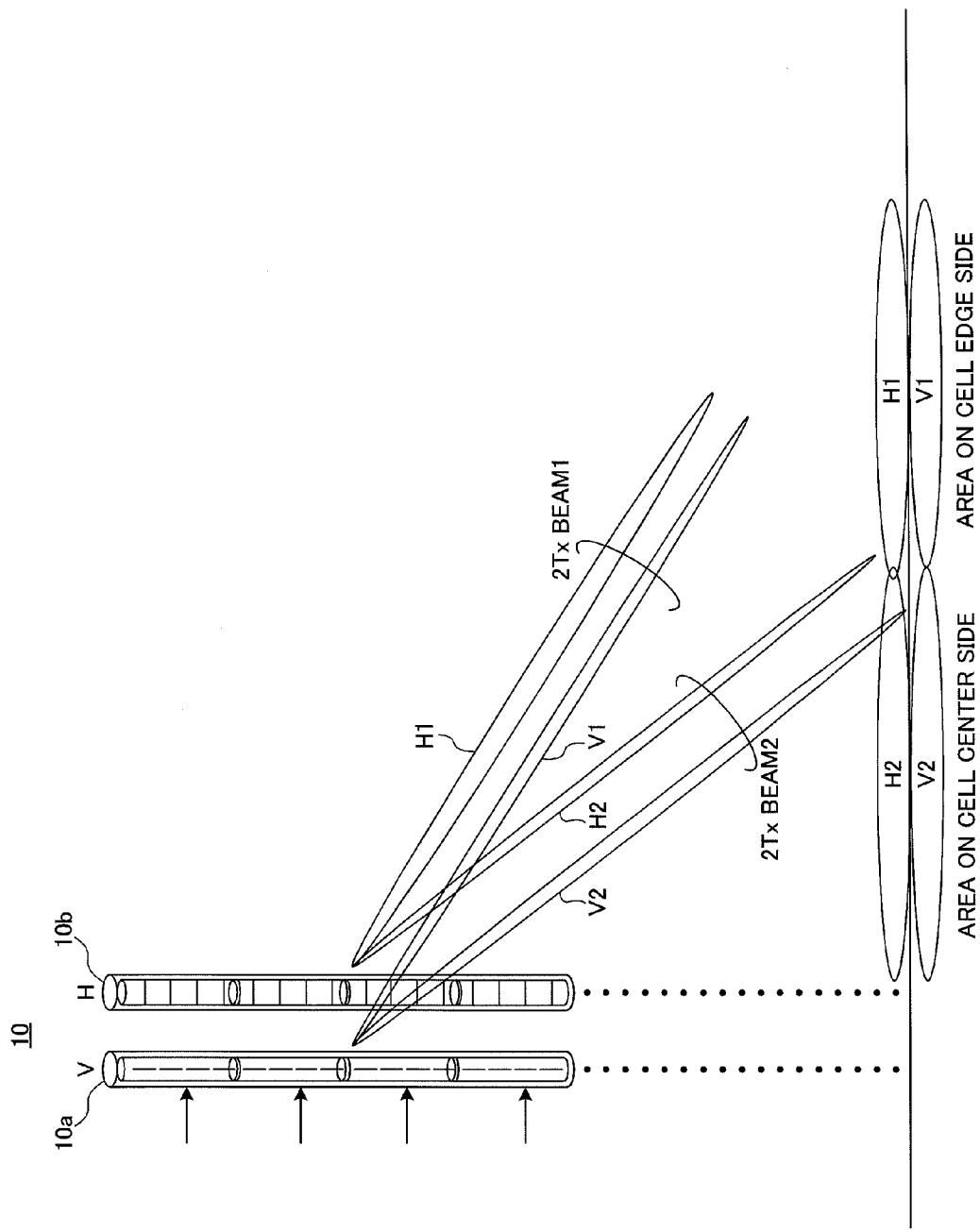
FIG. 3 is a conceptual diagram of vertical sectorization beams formed by an array antenna of a radio base station.

FIG. 3 is a conceptual diagram of vertical sectorization beams formed by the array antenna 10 constituting the antenna apparatus of the radio base station. Here, when the array antenna 10 is arranged to extend in a vertical direction, it is possible to form a plurality of beams that sectorize the space in vertical directions, but it is not always possible to sectorize the space in vertical directions, depending on the angle of the array antenna 10. In this specification, segmentation of space into a plurality of sectors by a plurality of beams (or beam groups) of varying tilts will be referred as "vertical sectorization," for ease of explanation.

First, vertical sectorization beam formation will be described. Transmission signal S1 to be input in all the antenna elements 11 constituting one group A on the array antenna 10 is multiplied by the same weight W (W11, W12, W13, W14=1, 1, 1, 1) to form beams. By this means, the vertically polarized antenna 10a forms beam V1 in association with transmission signal S1, and the horizontally polarized antenna 10b forms beam H1 in association with transmission signal S1. The whole array antenna 10 forms one antenna branch, so that, like the beams formed in communication type 1 described above, it is possible to form beams V1 and H1 having the maximum antenna gain and the minimum beam width. The radio communication system of the present embodiment transmits beams V1 and H1 toward cell edges. By beam group G1 combining beams V1 and H1 directed toward cell edges and having the same the tilt angle, two-antenna port transmission is provided.

Meanwhile, transmission signal S2 to be input in each antenna element 11 constituting one group A on the array antenna 10 is multiplied by weights W (W11, W12, W13, W14=1, exp(ja), exp(2ja), exp(3ja)) that give phase differences of equal intervals between neighboring branches. Here, the symbol "a" stands for the phase difference, and "j" stands for the complex conjugate. The tilt angles of beams V1 and H1 change depending on the phase difference "a" between neighboring branches. In proportion to the increase of the phase difference "a" between neighboring branches, the tilt angle grows larger. The vertically polarized antenna 10a forms beam V2 in association with transmission signal S2, and the horizontally polarized antenna 10b forms beam H2 in association with transmission signal S1. The radio communication system of the present embodiment sets a tilt angle to transmit beams V2 and H2 toward the center of the cell. By means of beam group G2 combining beams V2 and H2 having the same tilt angle toward the center of the cell, two-antenna port transmission is provided. By setting the tilt angle (phase difference a) of beams V2 and H2 to a greater value, beam group G2 sets a tilt angle toward a closer position to the center of the cell.

Consequently, in the radio communication system of the present embodiment, the radio base station is able to form beam group G1 (two-antenna port transmission) that is directed toward cell edges, and beam group G2 (two-antenna port transmission) that is directed toward the center of the cell, in parallel. In other words, the array antenna 10 is able to sectorize the cell space into a plurality of segments in vertical directions, make beam group G1 and beam group G2 have varying tilt angles, and form beam G1 or G2 in each vertical sector. To cover cases where space is not sectorized in vertical directions, it is equally possible to direct one beam group toward the first area and direct the other beam group to a second area.

In this way, the array antenna 10 forms beam group G1 (beams V1 and H1) that is directed toward cell edges and beam group G2 (beams V2 and H2) that is directed toward the center of the cell in parallel, so that, although, in comparison with the number of MIMO multiplexing=4, the capacity per beam group decreases, it is still possible to multiplex user terminals in parallel between cell edges and the center of the cell, and, consequently, the system as a whole can increase the capacity. Note that, although the number of beams in one beam group is not limited to 2-multiplexing, when the number of beams to multiplex increases, the processing load of user terminals increases exponentially.

Next, signaling using vertical sectorization beams will be described. In LTE and LTE-A, a CRS (Cell-specific Reference Signal), a CSI-RS (Channel State Information-Reference Signal), and a user-specific DM-RS (Demodulation-Reference Signal) and so on are defined as downlink reference signals. A CRS is transmitted in all downlink subframes, and is placed over the entire downlink frequency band. A CRS is used to perform channel estimation for downlink coherent detection. A CSI-RS is a reference signal for channel information measurement, and is used to measure CSI (CQI, PMI, rank). A user-specific DM-RS is transmitted in resource blocks that are allocated for downlink shared channel (DL-SCH) transmission to individual user terminals. A user-specific DM-RS is a user-specific demodulation reference signal which can be used in channel estimation for coherent detection of the downlink shared channel.

Although the radio base station forms a plurality of vertically sectorized beam groups G1 and G2 by means of the array antenna 10, different reference signals are allocated per antenna branch and per beam group. Upon forming the vertical sectorization beams shown in FIG. 3, the radio base station allocates reference signal R1 to beam V1 included in beam group G1, and allocates reference signal R2 to beam V2 included in separate beam group G2, with respect to the vertically polarized antenna 10a. Similarly, the radio base station allocates reference signal R1 to beam H1 included in beam group G1, and allocates reference signal R2 to beam H2 included in separate beam group G2, with respect to the horizontally polarized antenna 10b.

Figure 4:
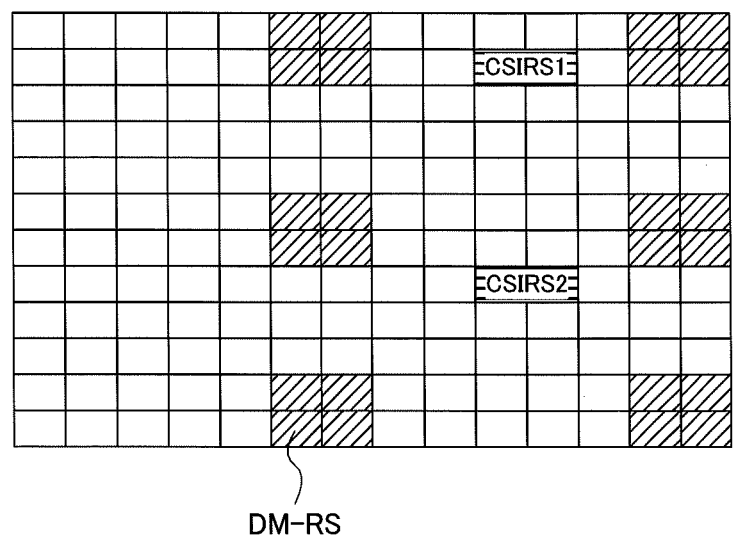
FIG. 4 is a diagram showing a configuration of reference signals arranged in a resource block (RB)

FIG. 4 shows a specific example of one resource block (RB) where different reference signals are allocated per antenna branch and per beam group. In LTE and LTE-A, one resource block is formed with 12 subcarriers×14 OFDM (or SC-FDMA) symbols. 1 subcarrier×1 OFDM (or SC-FDMA) symbol will be referred to as one resource element (RE). The system bandwidth, which ranges from 1.4 to 20 MHz, is defined by different numbers of RBs, and therefore the configuration of RBs is the same regardless of the system bandwidth.

In the resource block shown in FIG. 4, two CSI-RS 1 and CSI-RS 2 are allocated to different resources as downlink reference signals. The radio base station allocates CSI-RS 1 to beams V1 and H1 of one beam group G1 that is directed toward cell edges, and allocates CSI-RS 2 to beams V2 and H2 of the other beam group G2 that is directed toward the center of the cell. The resource positions of CSI-RS 1 and CSI-RS 2 corresponding to two beam groups G1 and G2 are reported to user terminals in advance.

In the radio communication system of the present embodiment, a user terminal receives vertical sectorization beams that are provided by the radio base station. The user terminal is reported the reference signal configuration of different reference signals (CSI-RS 1 and CSI-RS 2), corresponding to two beam groups G1 and G2 by, for example, RRC signaling. The user terminal generates communication quality information CSI (CQI, PMI, RI) based on reference signals signaled by the vertical sectorization beams, and reports this communication quality information CSI to the radio base station via the uplink. In LTE and LTE-A, it is possible to use the PUCCH (Physical Uplink Control Channel) defined for transmission of uplink control signals, and the PUSCH (Physical Uplink Shared Channel) defined for transmission of uplink data (including part of the control signals), as uplink signals. The radio base station selects the beam group to use to transmit data signals based on the communication quality information or the uplink signals reported from the user terminal. The type of the beam selection method for selecting the beam group may be reported to the user terminal by higher layer signaling. In the radio communication system of the present embodiment, one of or a combination of the plurality of beam selection methods below is applicable.

(Beam Selection Method 1)

With beam selection method 1, a user terminal having received a plurality of vertically sectorized beam groups G1 and G2 returns CSI in response to all the CSI-RSs (CSI-RS 1 and CSI-RS 2), and the radio base station to receive the CSI feedback selects adequate beams taking into account all the CSI-RSs.

The user terminal, upon receiving a plurality of beam groups G1 and G2 that are vertically sectorized, demodulates CSI-RS 1 and CSI-RS 2 that are allocated to each of beam groups G1 and G2. The user terminal separately generates CSI in response to all of CSI-RS 1 and CSI-RS 2. That is to say, the user terminal separately calculates the signal-to-interference ratio (SIR) and the channel matrix estimation value H' based on both CSI-RS 1 and CSI-RS 2. The CQIs and RIs are selected based on H's and the SIRs such that the block error rate does not exceed a predetermined error rate. As for the PMIs, optimal PMIs that are the closest to H's are selected from a codebook which defines a plurality of amounts of phase/amplitude control (precoding matrix) and PMIs (Precoding Matrix Indicators) that are associated with this precoding matrix. All the communication quality information CSI 1 (the CQI, PMI and RI acquired based on CSI-RS 1) and CSI 2 (the CQI, PMI and RI acquired based on CSI-RS 2), acquired based on all the reference signals (CSI-RS 1 and CSI-RS 2), are reported to the radio base station. CSI 1 and 2 can be transmitted using the PUSCH or the PUCCH.

From a plurality of pieces of communication quality information (CSI 1 and CSI 2) reported from the user terminal, the radio base station selects beam group G1 or G2 for transmitting the data signal (PDSCH) to be reported to that user terminal. As for the beam group, an optimal one or optimal ones are selected based on the communication quality information (CSI 1 and CSI 2). To transmit the data signal (PDSCH) to that user terminal using the selected beam group, the radio base station allocates resources, sets the number of MIMO layers and precoding weights, and updates the coding rate and so on, on an as-needed basis. For example, when beam group G1 is selected, the precoding weights, multiplied to form beams V2 and H2 included in beam group G2, are set to (0, 0, 0, 0) to make the branch inactive. Furthermore, the radio base station attaches a reference signal (DM-RS) to the data signal (PDSCH), with these pieces of information (resource allocation, the number of MIMO layers, precoding weights, coding rate, and beam selection information), and transmits this.

The user terminal demodulates the data signal (PDSCH) using a user-specific reference signal (DM-RS). The user terminal transmits uplink signals (PUSCH, and PUCCH) using the precoding weights to form the selected beams. Where a plurality of beam groups G1 and G2 are formed, the radio base station receives the uplink signals which the user terminal transmits using the beams that are determined earlier in the beam selection in the radio base station. The radio base station processes the uplink signals received in the beams determined in the beam selection.

(Beam Selection Method 2)

In beam selection method 2, a user terminal having received a plurality of beam groups G1 and G2 that are vertically sectorized reports the CSI pertaining to the beam group of the better quality, and its beam index, to the radio base station. By this means, it is possible to reduce the overhead of CSI feedback.

To be more specific, the user terminal receives a plurality of beam groups G1 and G2 that are vertically sectorized, and, based on all of CSI-RS 1 and CSI-RS 2, acquires communication quality information CSI 1 (the CQI, PMI and RI acquired based on CSI-RS 1) and CSI 2 (the CQI, PMI and RI acquired based on CSI-RS 2). In beam selection method 2, the CSI that is generated based on the CSI-RS of the beam group of the better performance between a plurality of pieces of communication quality information CSI 1 and CSI 2, and the beam index of that beam group, are reported to the radio base station. The beam index may be the group index of the beam group to which the beams belong.

From the communication quality information (CSI 1) of the beam group (for example, beam group G1) of the better performance and its beam index, which are reported from the user terminal, the radio base station selects beam group G1 as the beam group for transmitting the data signal (PDSCH) to be reported to that user terminal. To transmit the data signal (PDSCH) to that user terminal using selected beam group G1, the radio base station allocates resources, sets the number of MIMO layers and precoding weights, and updates the coding rate and so on, on an as-needed basis. Furthermore, the radio base station attaches a reference signal (DM-RS) to the data signal (PDSCH), with these pieces of information, and transmits this.

The user terminal demodulates the data signal (PDSCH) using a user-specific reference signal (DM-RS). The user terminal transmits uplink signals (PUSCH and PUCCH) using the precoding weights to form the selected beams. Where a plurality of beam groups G1 and G2 are formed, the radio base station receives the uplink signals which the user terminal transmits using the beams that are determined earlier in the beam selection in the radio base station. The radio base station processes the uplink signals received in the beams determined in the beam selection.

(Beam Selection Method 3)

In beam selection method 3, a user terminal having received a plurality of beam groups G1 and G2 that are vertically sectorized reports at least one of the received power level, received quality and SINR (Signal-to-Interference and Noise power Ratio) of each beam group to the radio base station. The received power level is reference signal received power (RSRP), which can be measured in the user terminal. The received quality is reference signal received quality, RSRQ, which represents the quality of reference signals. A case to select beams using RSRP will be described below.

A user terminal receives a plurality of beam groups G1 and G2 that are vertically sectorized, and, for all of CSI-RS 1 and CSI-RS 2, measures the RSRP of each beam group or beam based on CSI-RS 1 and CSI-RS 2. When a plurality of beams is included in one beam group, an average value of the RSRPs of the plurality of beams is determined, and this average value is used as the RSRP of the group. The RSRP of each beam group or beam, measured based on CSI-RS 1 and CSI-RS 2, is reported to the radio base station.

From the RSRPs of a plurality of beam groups or beams reported from the user terminal, the radio base station selects the beam group (G1 or G2) for transmitting the data signal (PDSCH) to be reported to that user terminal. As for the beam group, an optimal one or optimal ones are selected based on the RSRPs. To transmit the data signal (PDSCH) to that user terminal using the selected beam group, the radio base station allocates resources, sets the number of MIMO layers and precoding weights, and updates the coding rate and so on, on an as-needed basis. Furthermore, the radio base station attaches a reference signal (DM-RS) to the data signal (PDSCH), with these pieces of information, and transmits this.

The user terminal demodulates the data signal (PDSCH) using a user-specific reference signal (DM-RS). The user terminal transmits uplink signals (PUSCH and PUCCH) using the precoding weights to form the selected beams. Where a plurality of beam groups G1 and G2 are formed, the radio base station receives the uplink signals which the user terminal transmits using the beams that are determined earlier in the beam selection in the radio base station. The radio base station processes the uplink signals received in the beams determined in the beam selection.

(Beam Selection Method 4)

In beam selection method 4, the radio base station estimates which beam group or beam in the uplink signals transmitted from a user terminal is better. In LTE and LTE-A, the PUCCH that is defined for transmission of uplink control signals and the PUSCH that is defined for transmission of uplink data (including part of the control signals) can be used as uplink signals.

The radio base station receives the uplink signals transmitted from the user terminal, and, based on the uplink signals received, selects the beam group corresponding to the uplink signal of the better performance. To transmit the data signal (PDSCH) of that user terminal using the selected beam group, the radio base station allocates resources, sets the number of MIMO layers and precoding, and updates the coding rate and so on, on an as-needed basis. Furthermore, the radio base station attaches a reference signal (DM-RS) to the data signal (PDSCH), with these pieces of information, and transmits this.

The user terminal demodulates the data signal (PDSCH) using a user-specific reference signal (DM-RS). The user terminal transmits uplink signals (PUSCH and PUCCH) using the precoding weights to form the selected beams. Where a plurality of beam groups G1 and G2 are formed, the radio base station receives the uplink signals which the user terminal transmits using the beams that are determined earlier in the beam selection in the radio base station. The radio base station processes the uplink signals received in the beams determined in the beam selection.

(Mixed Operation)

In mixed operation, operation 1, which forms vertical sectorization beams and allocates different reference signals on a per beam group basis, and operation 2, which forms existing beams and allocates different reference signals on a per antenna branch basis, are both made active. The existing beams correspond to a plurality of beams that are included in one beam group and that have the same tilt angle, antenna gain and beam width. A plurality of beam groups is formed under operation 1, and also one beam or a plurality of beams is formed under operation 2.

In operation 2, although one beam group having the same tilt toward the same area is formed, the communication type (which corresponds to the antenna branch configuration) may include the above first communication type to the third communication type.

Figure 5:
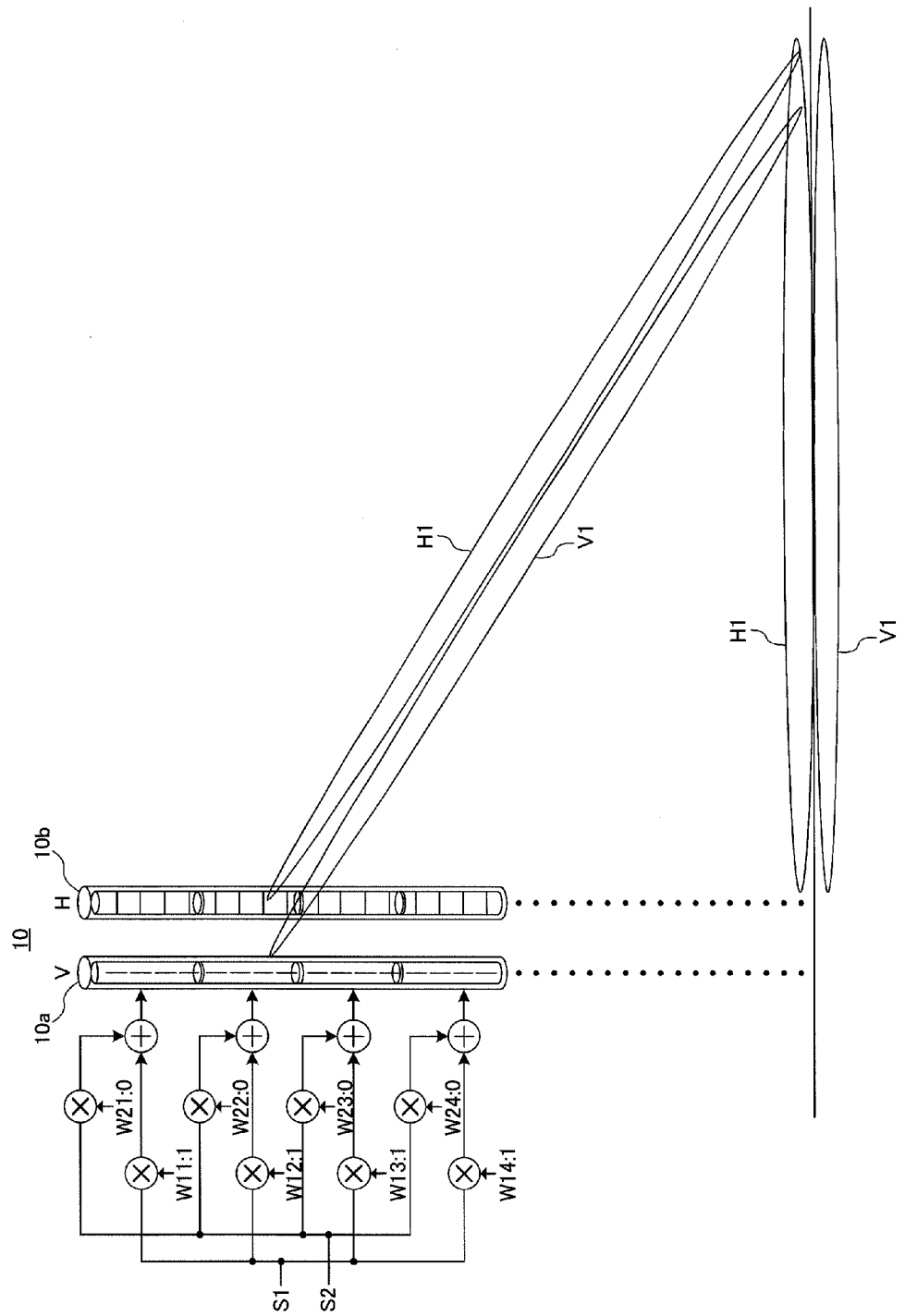
FIG. 5 is a diagram showing beams formed in a first communication type and their coverage.
Figure 7A:
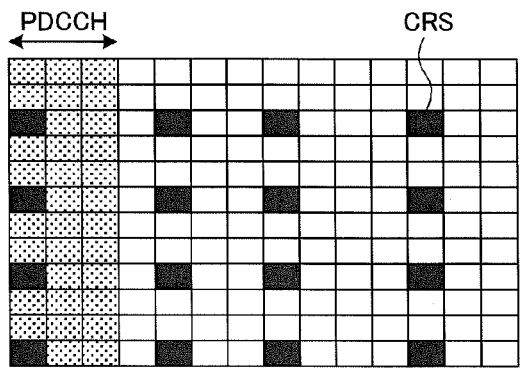
FIG. 7 provides diagrams showing arrangements of reference signals in a resource block under the first, second, and third communication types and mixed operation.

The first communication type is a two-beam type in which one antenna branch is formed with all of the antenna elements 11 constituting the array antenna 10, so that beam transmission of large coverage is provided as shown in FIG. 5. This is a transmission format that is suitable for user terminals that do not support 4-multiplex MIMO and 8-multiplex MIMO, and is able to realize space-frequency transmission diversity by SFBC. The same reference signal (for example, CRS) is allocated to the two beams. FIG. 7A shows the CRS configuration that is allocated to the beams corresponding to the first communication type.

Figure 6:
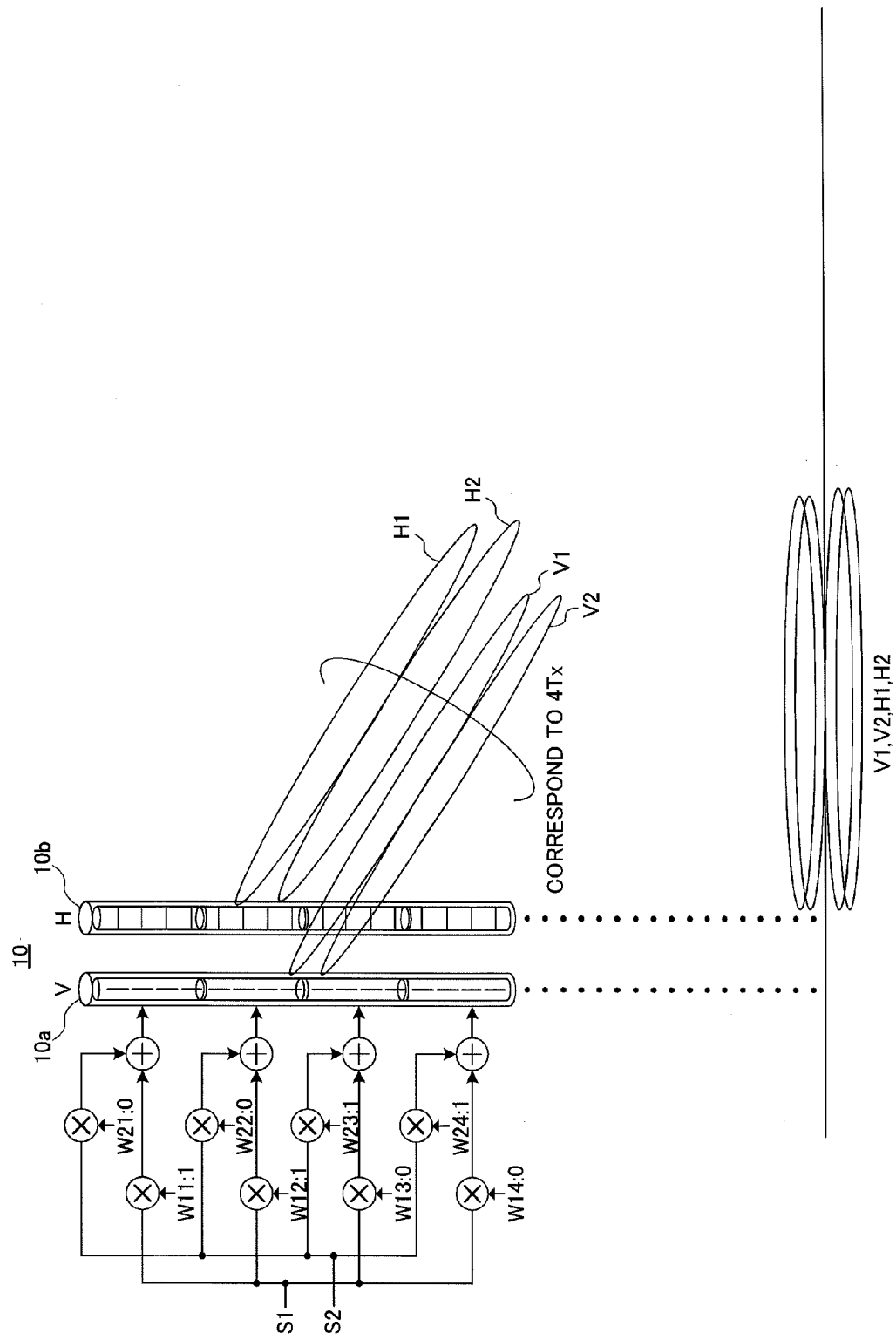
FIG. 6 is a diagram showing beams formed in a second communication type and their coverage.
Figure 7B:
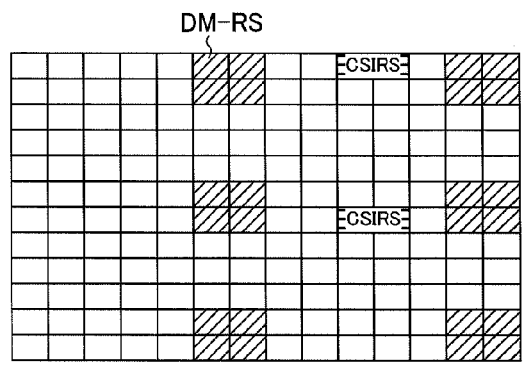

The second communication type is a four-beam type (V1, V2, H1 and H2), in which the array antenna 10 is formed with two antenna branches, and, although the coverage becomes smaller, the capacity increases, as shown in FIG. 6. This is a transmission format that is suitable for user terminals that support 4-multiplex MIMO. Two-antenna port transmission is provided, so that the same reference signal (CSI-RS) is allocated to the four beams (V1, V2, H1 and H2). FIG. 7B shows the reference signal (CSI-RS) configuration that is allocated to the beams corresponding to the second communication type.

Figure 7C:
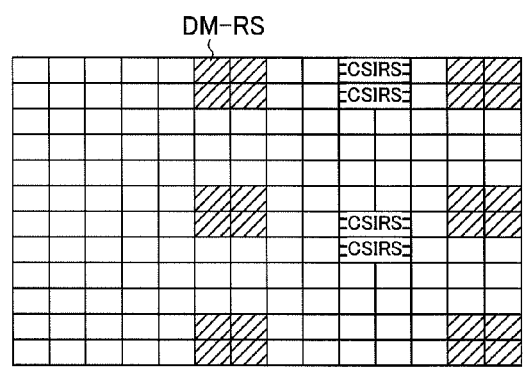

The third communication type is an eight-beam type (V1 to V4 and H1 to H4), in which the array antenna 10 is formed with four antenna branches, and, although the coverage becomes smaller, the capacity increases, as shown in FIG. 6. This is a transmission format that is suitable for user terminals that support 8-multiplex MIMO. Although eight-antenna port transmission is provided, the same reference signal (CSI-RS) is allocated to each antenna port. FIG. 7C shows the reference signal (CSI-RS) configuration that is allocated to the beams corresponding to the third communication type.

Figure 7D:
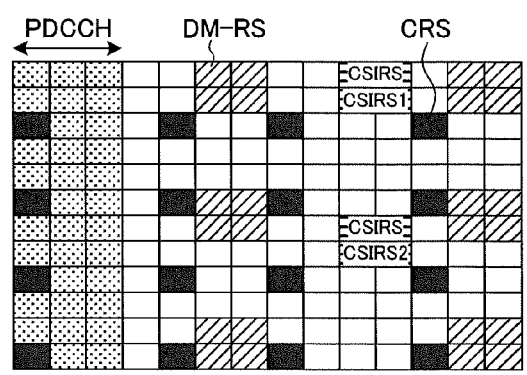

FIG. 7D shows the arrangement of reference signals in a resource block under mixed operation. However, reference signals to support eight antenna ports are not shown. In the two beams formed in the first communication type under operation 2, the CRS is arranged. In the four beams formed in operation 1, different reference signals (CSI-RS 1 and CSI-RS 2) are allocated per beam group.

In the mixed operation described above, it is possible to select adequate beam formation in accordance with the functions of user terminals (Rel8/Rel10/Rel11) and the phase of the communication sequence. Also, given that all user terminals are able to dynamically make a fallback to Rel8 SFBC, which is provided in communication type 1, it is possible to prevent the coverage from becoming smaller.

Figure 8:
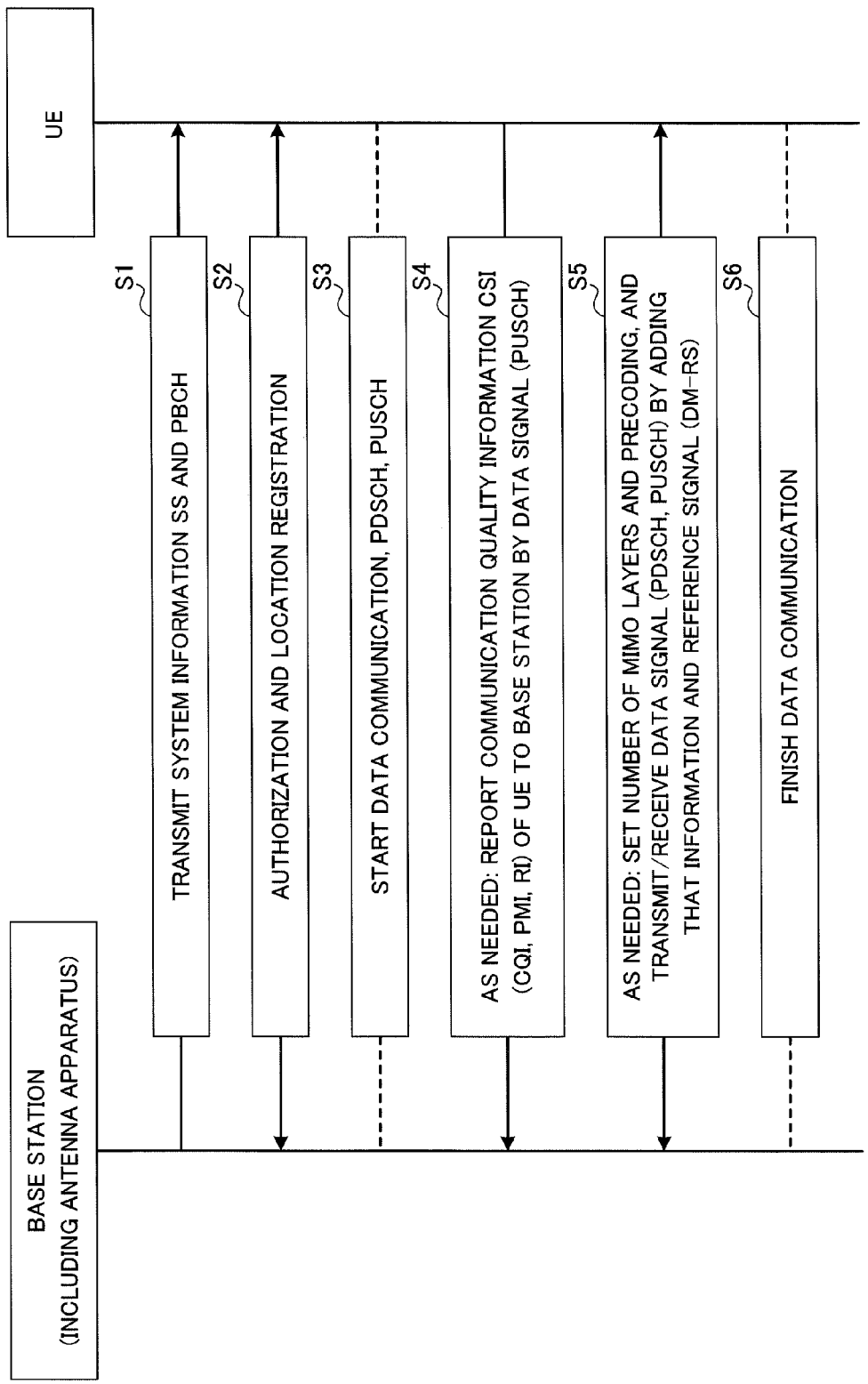
FIG. 8 is a diagram showing the basic sequence between a radio base station and a user terminal.

Next, the sequence between the radio base station and user terminals in the radio communication system according to the present embodiment will be described. FIG. 8 is a diagram showing the basic sequence between the radio base station and a user terminal.

(Step S1)

The radio base station transmits broadcast information from an antenna apparatus (array antenna 10). LTE and LTE-A define a physical broadcast channel (PBCH) to transmit a synchronization signal (SS) that is used in a cell search to detect the cell which a user terminal UE should connect with, and system information (SIB and MIB) that become necessary after the cell search. The radio base station transmits the synchronization signal (SS) and the physical broadcast channel (PBCH) under a one-antenna branch configuration in which the antenna apparatus supports communication type 1. That is, in four groups C1 to C4 in the array antenna 10, transmission signal S1, which is multiplied by the same weight W (W11, W12, W13, W14=1, 1, 1, 1), is input, and also transmission signal S2, which is multiplied by the same weight W (W21, W22, W23, W24=1, 1, 1), is input. By this means, it is possible to form beams having the maximum antenna gain and the minimum beam width. A user terminal UE that desires to connect with a cell must always receive the synchronization signal (SS) and the physical broadcast channel (PBCH), so that, while the synchronization signal (SS) and the physical broadcast channel (PBCH) have to encompass all in the area as their coverage, the beam formation to correspond to communication type 1 is suitable for a wide coverage.

(Step S2)

Given that the beam formation to support communication type 1 has a wide coverage, a user terminal UE is able to receive the synchronization signal (SS) and the physical broadcast channel (PBCH) anywhere in the area. The user terminal UE finds and synchronizes with a cell in the network based on the synchronization signal (SS) received, acquires system information by decoding the physical broadcast channel (PBCH) received, and connects with the cell (radio base station) based on the system information. Then, authorization and location registration are performed between the core network and the user terminal via the radio base station.

(Step S3)

The radio base station starts data communication with the user terminal UE that is connected with the cell. Data communication in the radio communication system is executed via the PDSCH on the downlink and executed via the PUSCH on the uplink. In the radio communication system of the present embodiment, until before the beam selection that is performed immediately after data communication is started, the downlink data signal (PDSCH), cell-specific reference signals (CRS and CSI-RS), downlink control signals (PDCCH, PCHICH, PHICH) and so on are transmitted using vertical sectorization beams (a plurality of beam groups G1 and G2 having varying tilt angles) (FIG. 3).

(Step S4)

The user terminal UE generates communication quality information based on reference signals transmitted in a plurality of beam groups G1 and G2. When above-described beam selection method 1 is applied to the user terminal UE, CSI is respectively generated for all of CSI-RS 1 and CSI-RS 2 in accordance with beam selection method 1, and all the CSI are reported by the data signal (PUSCH) on an as-needed basis. Also, when beam selection method 2 is applied to the user terminal UE, from a plurality of pieces of communication quality information CSI 1 and CSI 2, the CSI that is generated based on the CSI-RS of the beam group of the better performance, and the beam index of that beam group, are reported to the radio base station. Also, when beam selection method 3 is applied to the user terminal UE, the RSRP of each beam group or beam is measured based on CSI-RS 1 and CSI-RS 2, and the RSRP of each beam group or beam is reported to the radio base station. Note that, when beam selection method 4 is applied to the user terminal UE, although CSI is reported from the user terminal UE to the radio base station, this feedback CSI is not taken into account in beam selection.

(Step S5)

When beam selection method 1 is applied, based on communication quality information CSI 1 and CSI 2 for all the beam groups, reported from the user terminal UE, the radio base station selects the beam group (or beam) for transmitting the data signal (PDSCH) of that user terminal UE. Also, when beam selection method 2 is applied, the radio base station selects the beam group of the better performance as the beam group (or beam) for transmitting the data signal (PDSCH) of that user terminal UE, based on the communication quality information CSI for the beam group of the better performance and the beam index reported from the user terminal. When beam selection method 3 is applied, the radio base station selects the beam group (or beam) for transmitting the data signal (PDSCH) of that user terminal UE based on the RSRPs reported from the user terminal UE. When beam selection method 4 is applied, the radio base station selects the beam group (or beam) for transmitting the data signal (PDSCH) of that user terminal UE based on uplink signals from the user terminal UE.

To transmit the data signal (PDSCH) to the user terminal UE based on CSI reported from that user terminal UE, the radio base station allocates resources, sets the number of MIMO layers and precoding weights, and updates the coding rate and so on, on an as-needed basis. In particular, when the beam group is already selected, precoding weights to form the selected beam group are used. The radio base station makes the array antenna 10 reflect the resource allocation for data signal transmission, the number of MIMO layers, the precoding weights, and the coding rate for channel coding. Furthermore, the radio base station attaches a reference signal (DM-RS) to the data signal (PDSCH) with these pieces of information, and transmits this.

The user terminal UE receives downlink signals (PUCCH and PDSCH) using the beams (or beam group) that are determined in beam selection. The user terminal UE demodulates the data signal (PDSCH) using a user-specific reference signal (DM-RS) included in the downlink signals. The user terminal UE transmits uplink signals (PUSCH and PUCCH) using the precoding weights to form the selected beams. Where a plurality of beam groups G1 and G2 are formed, the radio base station receives the uplink signals which the user terminal UE transmits using the beams that are determined earlier in the beam selection in the radio base station. The radio base station processes the uplink signals received in the beams determined in the beam selection. (Step S6)

When data communication is finished, the resources allocated to that user terminal UE are released.

Note that, in step S3 of FIG. 8, the UE-specific control signal (which may also be referred to as E-PDCCH, ePDCCH, enhanced PDCCH, UE-PDCCH and so on) that is multiplexed in the PDSCH region may also be transmitted by vertical sectorization beams (a plurality of beam groups G1 and G2 having varying tile angles).

Now, the radio communication system according to the above-described embodiment will be described below in detail with reference to the accompanying drawings.

Figure 9:
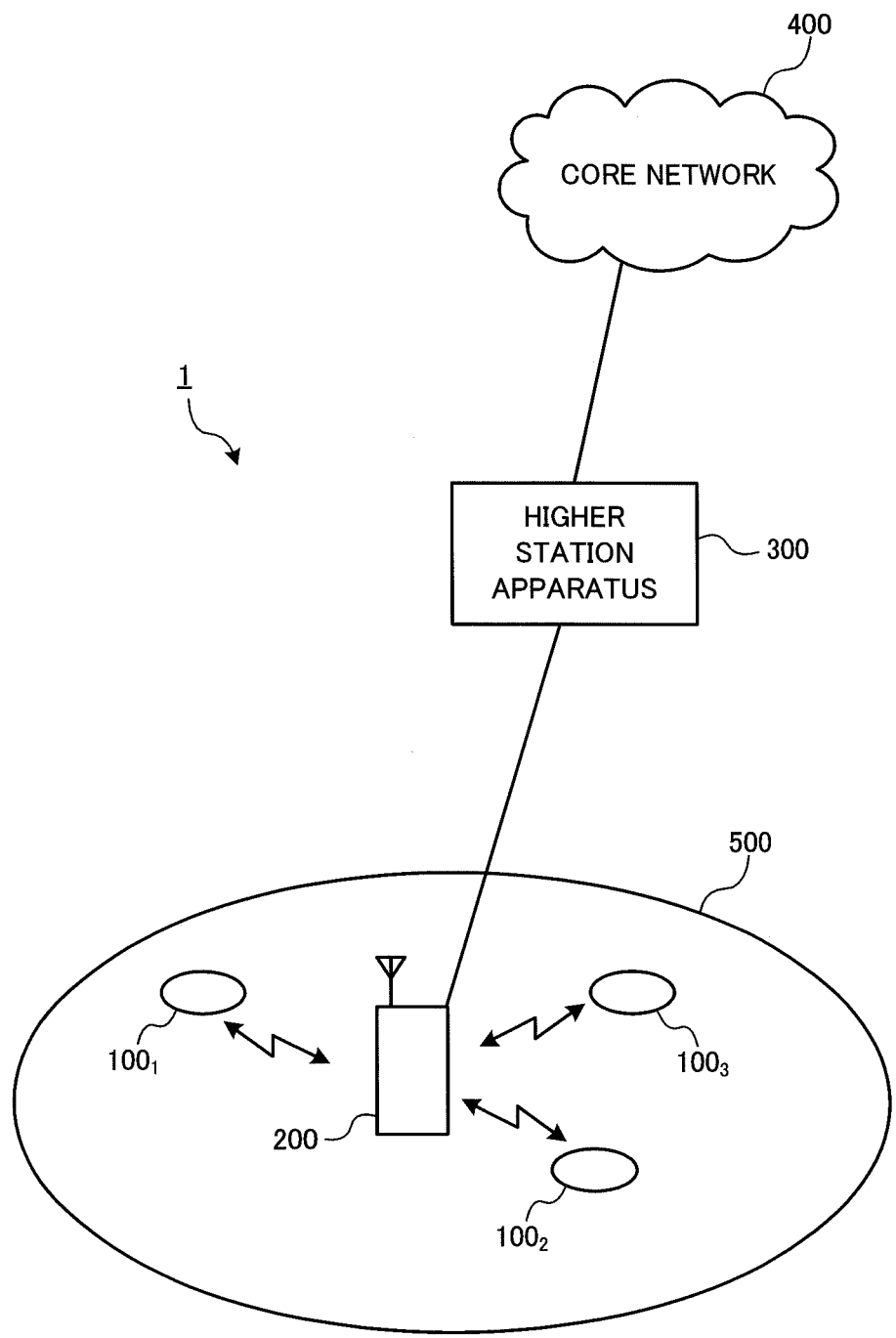
FIG. 9 is a diagram showing a network configuration of a radio communication system according to an embodiment.

A radio communication system 1 having a user terminal (hereinafter referred to as "mobile station 100") and a radio base station (eNodeB) 200 according to the present embodiment will be described with reference to FIG. 9. FIG. 9 is a drawing for explaining the configuration of the radio communication system 1 having the mobile station 100 and the radio base station 200 according to an embodiment of the present invention. Note that the radio communication system 1 shown in FIG. 9 is a system to accommodate, for example, the LTE system or SUPER 3G. Also, this mobile communication system 1 may be referred to as IMT-Advanced or may be referred to as 4G.

As shown in FIG. 9, the radio communication system 1 is configured to include a radio base station 200 and a plurality of mobile stations 100 ($100_1$, $100_2$, $100_3$, ... $100_n$, where n is an integer to satisfy n>0) that communicate with this radio base station 200. The radio base station 200 is connected with a higher station apparatus 300, and this higher station apparatus 300 is connected with a core network 400. The mobile stations 100 communicate with the radio base station 200 in a cell 500. Note that the higher station apparatus 300 includes, for example, an access gateway apparatus, a radio network controller (RNC), a mobility management entity (MME) and so on, but is by no means limited to these.

The mobile stations ($100_1$, $100_2$, $100_3$, ... $100_n$) have the same configuration, functions and state, and therefore will be described below simply as "mobile station 100," unless specified otherwise. Also, although the mobile station 100 will be described to perform radio communication with the radio base station 200 for ease of explanation, more generally, user apparatuses (UE: User Equipment) including mobile terminal apparatuses and fixed terminal apparatuses may be used as well.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. OFDMA is a multi-carrier transmission scheme to perform communication by dividing a frequency band into a plurality of narrow frequency bands (subcarriers) and mapping data to each subcarrier. SC-FDMA is a single carrier transmission scheme to reduce interference between terminals by dividing, per terminal, the system band into bands formed with one or continuous resource blocks, and allowing a plurality of terminals to use mutually different bands.

Here, communication channels in the LTE/LTE-A systems will be described. On the downlink, a PDSCH, which is used by each mobile station 10 on a shared basis, and downlink L1/L2 control channels (PDCCH, PCFICH and PHICH), are used. By means of this PDSCH, user data, that is, normal data signals, is transmitted. Transmission data is included in this user data. Note that the component carriers (CCs) and scheduling information allocated to the mobile station 100 in the radio base station 200 are reported to the mobile station 100 by the L1/L2 control channels.

On the uplink, a PUSCH, which is used by each mobile station 100 on a shared basis, and a PUCCH, which is an uplink control channel, are used. User data is transmitted by means of this PUSCH. Also, downlink radio quality information (CQI: Channel Quality Indicator) and so on are transmitted by the PUCCH.

Figure 10:
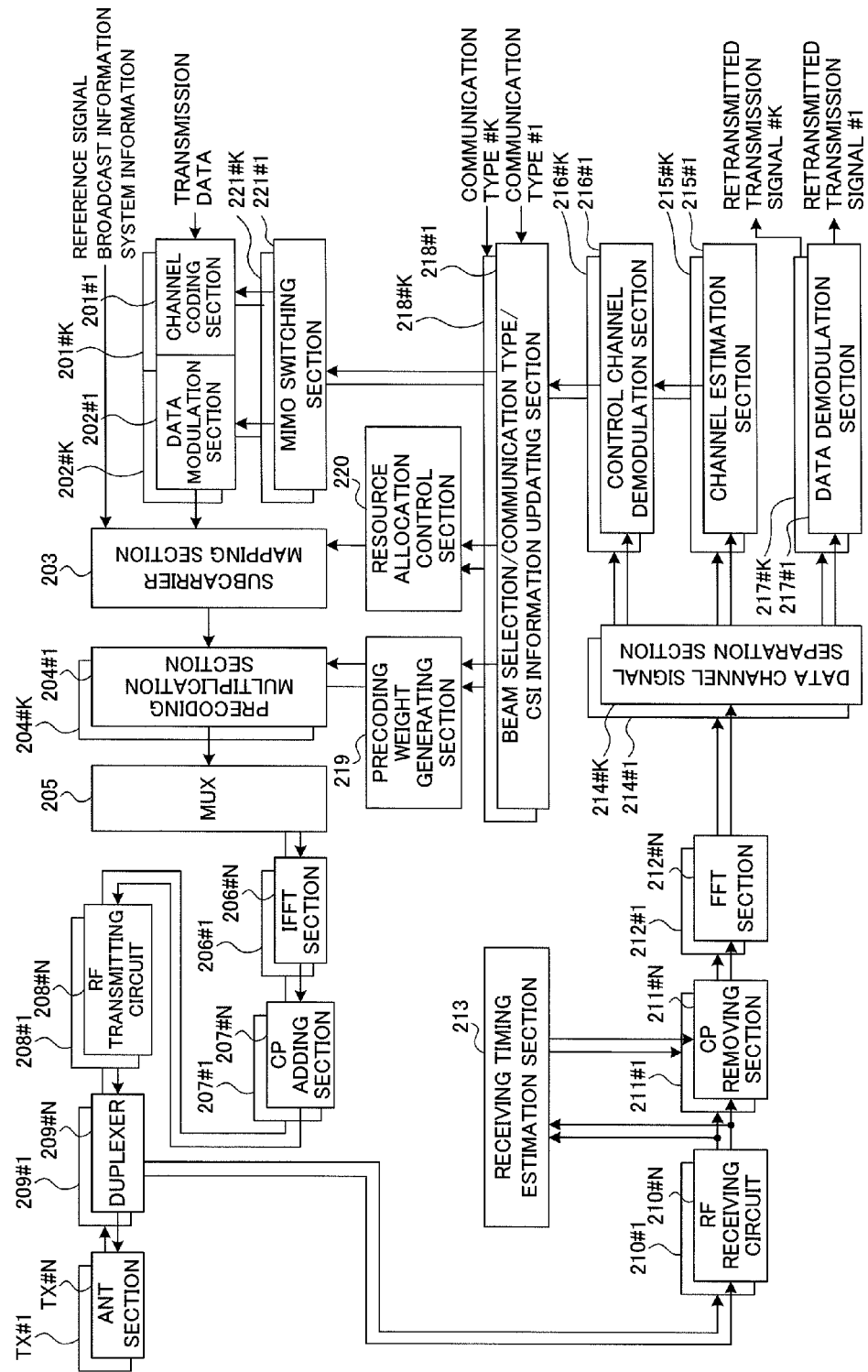
FIG. 10 is a block diagram showing a configuration of a radio base station according to an embodiment.
Figure 11:
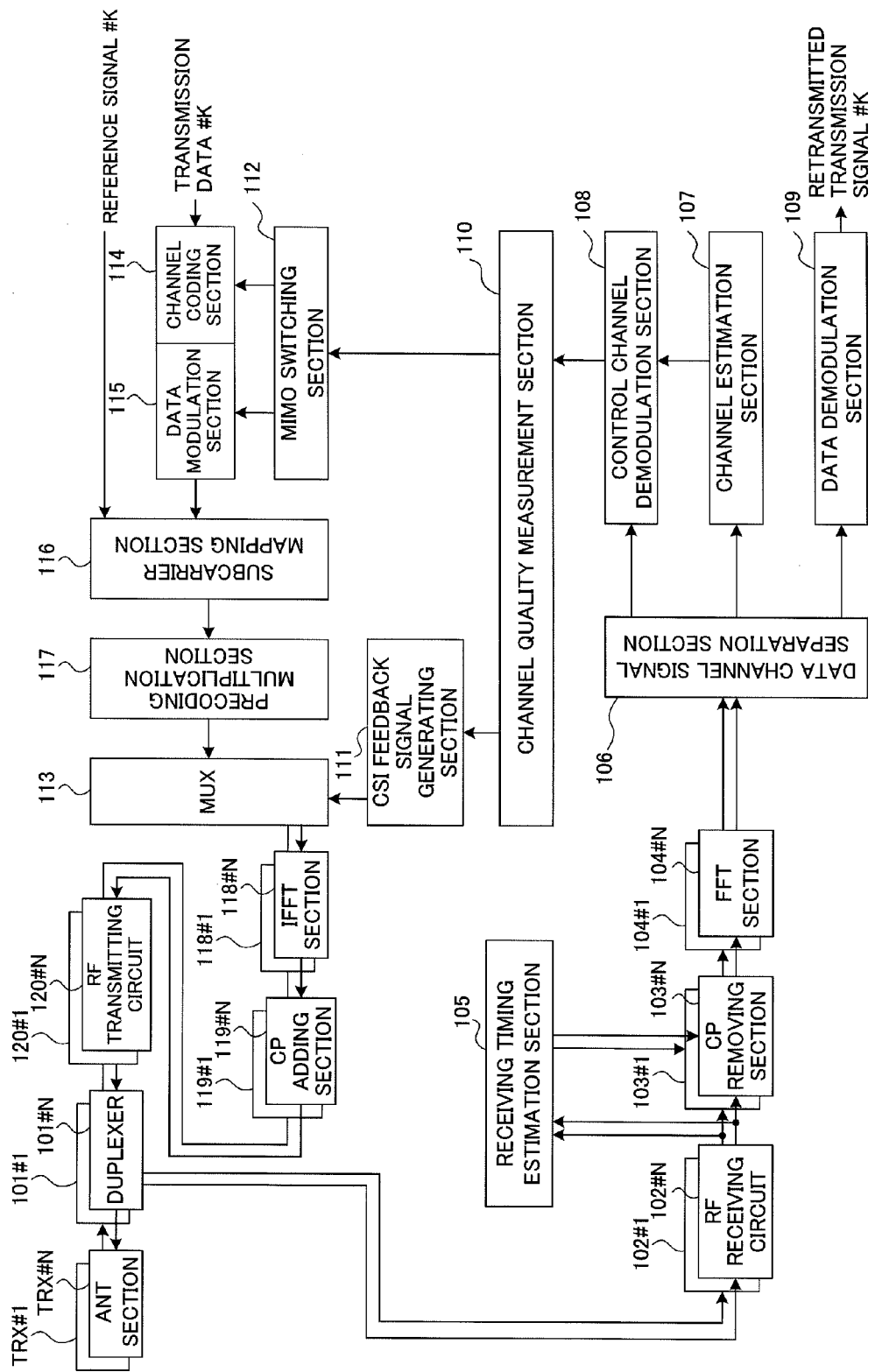
FIG. 11 is a block diagram showing a configuration of a mobile station according to an embodiment.

FIG. 10 is a block diagram showing a configuration of the radio base station 200 according to the present embodiment. FIG. 11 is a block diagram showing a configuration of the mobile station 100 according to the present embodiment. Note that, although the configurations of the radio base station 200 and the mobile station 100 shown in FIG. 10 and FIG. 11 are simplified to explain the present invention, these have configurations which a normal radio base station and mobile station should have.

In the radio base station 200 shown in FIG. 10, a scheduler, which is not shown, determines the number of users to be multiplexed (the number of users multiplexed) based on channel estimation values given from channel estimation sections 215 #1 to 215 #K, which will be described later. Then, the details of uplink/downlink resource allocation (scheduling information) for each user are determined, and transmission data #1 to #K for users #1 to #K are transmitted to corresponding channel coding sections 201 #1 to 201 #K.

Transmission data #1 to #K are subjected to channel coding in channel coding sections 201 #1 to 201 #K, and, after that, output to data modulation sections 202 #1 to 202 #K and subjected to data modulation. At this time, the channel coding and the data modulation are performed based on channel coding rates and modulation schemes given from MIMO switching sections 221 #1 to 221 #K, which will be described later. Transmission data #1 to #K, having been subjected to data modulation in data modulation sections 202 #1 to 202 #K, are subjected to an inverse Fourier transform in a discrete Fourier transform section, which is not shown, and converted from time sequence signals to frequency domain signals, and output to a subcarrier mapping section 203.

The subcarrier mapping section 203 maps transmission data #1 to #K to subcarriers in accordance with resource allocation information that is given from a resource allocation control section 220, which will be described later. At this time, the subcarrier mapping section 203 maps (multiplexes) reference signals #1 to #K that are input from a reference signal generating section, which is not shown, and broadcast information and system information that are input from a broadcast information generating section and a system information generating section, to subcarriers, with transmission data #1 to #K. Transmission data #1 to #K, mapped to the subcarriers in this way, are output to precoding multiplication sections 204 #1 to 204 #K.

Precoding multiplication sections 204 #1 to 204 #K apply a phase and/or amplitude shift to transmission data #1 to #K, for each of antennas TX #1 to TX #N, based on precoding weights given from a precoding weight generating section 219 (weighting of antenna TX #1 to antenna TX #N by precoding), which will be described later. The precoding weights make it possible to select the communication type (from communication type 1 to communication type 3) and furthermore switch between "ON" and "OFF" of vertical sectorization beams. Transmission data #1 to #K, having been subjected to a phase and/or amplitude shift by precoding multiplication sections 204 #1 to 204 #K, are output to a multiplexer (MUX) 205.

In the multiplexer (MUX) 205, transmission data #1 to #K, having been subjected to a phase and/or amplitude shift, are combined, and transmission signals are generated for each of antennas TX #1 to TX #N. The transmission signals generated in the multiplexer (MUX) 205 are subjected to an inverse fast Fourier transform in inverse fast Fourier transform sections (IFFT unit) 206 #1 to 206 #N and converted from frequency domain signals to time domain signals. Then, after CPs are attached in cyclic prefix (CP) adding sections 207 #1 to 207 #N, the signals are output to RF transmitting circuits 208 #1 to 208 #N. Then, after a frequency conversion process for conversion into a radio frequency band is applied in RF transmitting circuits 208 #1 to 208 #N, the signals are output to antennas TX #1 to TX #N via duplexers 209 #1 to 209 #N, and transmitted from antennas TX #1 to TX #N to the mobile station 100 on the downlink. Antennas TX #1 to TX #N are formed with the array antenna 10 shown in FIG. 1.

Meanwhile, transmission signals that are output from the mobile station 100 on the uplink are received by antennas TX #1 to TX #N, electrically separated into the transmitting route and the receiving route in duplexers 209 #1 to 209 #N, and, after that, output to RF receiving circuits 210 #1 to 210 #N. Then, a frequency conversion process for conversion from radio frequency signals into baseband signals is performed in RF receiving circuits 210 #1 to 210 #N. The baseband signals, to which the frequency conversion process has been applied, has the CPs removed in CP removing sections 211 #1 to 211 #N, and then output to fast Fourier transform sections (FFT sections) 212 #1 to 212 #N. A receiving timing estimation section 213 estimates the receiving timing from the reference signals included in the received signals, and reports the estimation result to CP removing sections 211 #1 to 211 #N. FFT sections 212 #1 to 212 #N perform a Fourier transform of the input received signals, and convert the signals from time sequence signals to frequency domain signals. These received signals, converted into frequency domain signals, are output to data channel signal separation sections 214 #1 to 214 #K.

Data channel signal separation sections 214 #1 to 214 #K separate the received signals that are received as input from FFT sections 212 #1 to 212 #N by, for example, the minimum mean squared error (MMSE) and maximum likelihood detection (MLD) signal separation methods. By this means, the received signals that have arrived from the mobile station 100 are divided into received signals pertaining to user #1 to user #K. Channel estimation sections 215 #1 to 215 #K estimate the channel states from the reference signals included in the received signals separated in data channel signal separation sections 214 #1 to 214 #K, and report the estimated channel states to control channel demodulation sections 216 #1 to 216 #K.

The received signals related to user #1 to user #K, separated by data channel signal separation sections 214 #1 to 214 #K, are demapped in a subcarrier demapping section, which is not shown, and converted back to time sequence signals, and, after that, subjected to data demodulation in data demodulation section 217 #1 to 217 #K. Then, by executing channel decoding in channel decoding sections #1 to #K, which are not shown, transmission signals #1 to transmission signal #K are reconstructed.

Control channel demodulation sections 216 #1 to 216 #K demodulate the control channel signals (for example, the PDCCH) included in the received signals separated in data channel signal separation sections 214 #1 to 214 #K. At this time, based on the channel states reported from channel estimation sections 215 #1 to 215 #K, control channel demodulation sections 216 #1 to 216 #K demodulate the control channel signals corresponding to user #1 to user #K. The control channel signals demodulated by control channel demodulation sections 216 #1 to 216 #K are output to beam selection/communication type/CSI information updating sections 218 #1 to 218 #K.

Beam selection/communication type/CSI information updating sections 218 #1 to 218 #K extract the channel state information (CSI) included in each control channel signal (for example, the PUCCH) or the shared data channel signal (PUSCH) received as input from control channel demodulation sections 216 #1 to 216 #K, and always keep the CSI updated in the latest state. For example, the CSI includes the PMIs, RIs and CQIs. Also, beam selection/communication type/CSI information updating sections 218 #1 to 218 #K hold the communication type information per user, reported from the higher station apparatus 300, and always keep the communication type information updated in the latest state. The communication type information is reported by, for example, higher control signals from the higher station apparatus 300. Also, beam selection/communication type/CSI information updating sections 218 #1 to 218 #K adopt one of the above-described beam selection methods. When beam selection method 1 is applied, CSI 1 and CSI 2 are returned in response to a plurality of beam groups G1 and G2, respectively. Beam selection/communication type/CSI information updating sections 218 #1 to 218 #K select beam group G1 or G2 for transmitting the data signal (PDSCH) to be reported to the mobile station 100 in accordance with beam selection method 1. When beam selection method 2 is applied, only the CSI (and the beam index) of the beam group of the better performance is returned in response to a plurality of beam groups G1 and G2. Beam selection/communication type/CSI information updating sections 218

1 to 218 #K select the beam index to which the CSI is associated. When beam selection method 3 is applied, the RSRP of each beam group, measured based on CSI-RS 1 and CSI-RS 2, is reported from the mobile statin 100. Beam selection/communication type/CSI information updating sections 218 #1 to 218 #K are given the RSRP of each beam group from the control channel demodulation section 216 or the data demodulation section 217, and, based on these RSRPs, select the beam group of the better performance. When beam selection method 4 is applied, the beam group of the better performance is selected from the uplink signals—for example, the uplink control signal (PUCCH or PUSCH). The uplink signals are reported via a plurality of beam groups G1 and G2 like downlink signals, so that it is possible to determine a beam group of better performance from uplink signals as well. When a beam selection method is applied, beam selection/communication type/CSI information updating sections 218 #1 to 218 #K always hold the latest beam selection information.

The beam selection information, CSI and communication type information updated in beam selection/communication type/CSI information updating sections 218 #1 to 218 #K are each output to the precoding weight generating section 219, the resource allocation control section 220 and MIMO switching section 221 #1 to 221 #K.

Based on the beam selection information, CSI and communication type information received as input from beam selection/communication type/CSI information updating sections 218 #1 to 218 #K, the precoding weight generating section 219 generates precoding weights, which represent the amounts of a phase and/or amplitude shift for transmission data #1 to #K. The generated precoding weights are output to precoding multiplication sections 204 #1 to 204 #K, and used in the precoding of transmission data #1 to transmission data #K.

For example, when forming vertical sectorization beams, the same weight W (W11, W12, W13, W14=1, 1, 1, 1) is set for transmission signal S1 to be input in all the antenna elements 11 constituting group A (FIG. 1A), and, likewise, weights W (W11, W12, W13, W14=1, exp(ja), exp(2ja), exp(3ja)) to provide phase differences of equal intervals between neighboring branches are set for transmission signal S2 to be input in each antenna element 11 constituting group A. Also, when the first communication type is selected, the same weight W (W11, W12, W13, W14=1, 1, 1, 1) is set for transmission signal S1 to be input in all the antenna elements 11 constituting group A (FIG. 1A). Also, when the second communication type is selected, weights (W11, W12, W13, W14)=(1, 1, 0, 0) are set for transmission signal S1 to make only group B1 an active branch, and weights (W11, W12, W13, W14)=(0, 0, 1, 1) are set for transmission signal S2 to make only group B2 an active branch.

The resource allocation control section 220 determines the resource allocation information to allocate to each user based on the CSI and communication type information received as input from beam selection/communication type/ CSI information updating sections 218 #1 to 218 #K. For example, when forming vertical sectorization beams, different reference signals are allocated to different resources, per antenna branch and per beam group. Also, when communication type 1 is selected, the same reference signal (CRS) is assigned to all the beams. Also, when communication type 2 or 3 is selected, the same reference signal (CSI-RS) is allocated to all the beams, and also different resources are allocated to the reference signals (CSI-RS) per antenna port. FIGS. 7A, 7B, and 7C show the configurations of the arrangement of reference signals. The resource allocation information that is determined by the resource allocation control section 220 is output to the subcarrier mapping section 203 and used for the mapping of transmission data #1 to transmission data #K.

MIMO switching sections 221 #1 to 221 #K select the MIMO transmission schemes to use for transmission data #1 to transmission data #K based on the CSI and the communication type information received as input from beam selection/communication type/CSI information updating sections 218 #1 to 218 #K. For example, if communication type 1 is designated, 2×2 MIMO transmission can be selected, and, if communication type 2 is designated, 4×4 MIMO transmission can be selected. Then, the channel coding rates and modulation schemes for transmission data #1 to transmission data #K to match the selected MIMO transmission schemes are determined. The determined channel coding rates are output to channel coding sections 201 #1 to 201 #K, and the determined modulation schemes are output to data modulation sections 202 #1 to 202 #K.

Meanwhile, in the mobile station 100 shown in FIG. 11, transmission signals transmitted from the radio base station 200 are received by transmitting/receiving antennas TRX #1 to TRX #N, electrically separated into the transmitting route and the receiving route in duplexers 101 #1 to 101 #N, and then output to RF receiving circuits 102 #1 to 102 #N. Then, a frequency conversion process to convert radio frequency signals into baseband signals is performed in RF receiving circuits 102 #1 to 102 #N. The baseband signals have the CPs removed in cyclic prefix (CP) removing sections 103 #1 to 103 #N, and, after that, output to fast Fourier transform sections (FFT sections) 104 #1 to 104 #N. The receiving timing estimation section 105 estimates the receiving timing from the reference signals included in the received signals, and reports the estimation result to CP removing sections 103 #1 to 103 #N. FFT sections 104 #1 to 104 #N perform a Fourier transform on the received signals that are received as input, and convert the time sequence signals into frequency domain signals. The received signals converted into frequency domain signals are output to the data channel signal separation sections 106.

The data channel signal separation section 106 separates the received signals received as input from FFT sections 104 #1 to 104 #N, by, for example, the minimum mean squared error (MMSE) and maximum likelihood detection (MLD) signal separation methods. By this means, the received signals having arrived from the radio base station 200 are separated into received signals pertaining to user #1 to user #K, and the received signal pertaining to the user of the mobile station 100 (here, user K) is extracted. The channel estimation section 107 estimates the channel states from the reference signals included in the received signals separated in the data channel signal separation section 106, and reports the estimated channel states to the control channel demodulation section 108.

The received signal pertaining to user #K, separated in the data channel signal separation section 106, is demapped in a subcarrier demapping section, which is not shown, converted back to a time sequence signal, and then demodulated in the data demodulation section 109. Then, as channel decoding is executed in a channel decoding section, which is not shown, transmission signal #K is reconstructed.

The control channel demodulation section 108 demodulates the control channel signals (for example, the PDCCH) included in the received signals separated in the data channel signal separation section 106. When this takes place, the control channel demodulation section 108 demodulates the control channel signal corresponding to user #K, based on the channel states reported from the channel estimation section 107. Each control channel signal demodulated by the control channel demodulation section 108 is output to a channel quality measurement section 110.

The channel quality measurement section 110 measures channel quality (CQI) based on the control channel signals received as input from the control channel demodulation section 108. When vertical sectorization beams formed with a plurality of beam groups are received, different reference signals (CSI-RS 1 and CSI-RS 2) are allocated on a per beam group basis (FIG. 4). The channel quality measurement section 110 measures CQI separately, based on all the reference signals (CSI-RS 1 and CSI-RS 2). Also, the channel quality measurement section 110 selects the PMIs and RIs based on the CQIs measured. When beam selection method 1 is applied, the channel quality measurement section 110 generates CSI (CQI, PMI, RI) with respect to all the beam groups. When beam selection method 2 is applied, the channel quality measurement section 110 generates CSI (CQI, PMI, RI) only with respect to the beam group of the better performance. When beam selection method 3 is applied, the channel quality measurement section 110 measures the RSRP of each beam group (or beam) based on CSI-RS 1 and CSI-RS 2. Then, the CSI (CQIs, PMIs and RIs) or the RSRPs are reported to the CSI feedback signal generating section 111 and the MIMO switching section 112.

In the CSI feedback signal generating section 111, a CSI feedback signal to feed back to the radio base station 200 is generated. In this case, the CSI feedback signal includes the CQIs, PMIs and RIs reported from the channel quality measurement section 110. When beam selection method 3 is applied, the RSRP of each beam group (or beam) is included. The feedback signal (CSI feedback, RSRP feedback) generated in the CSI feedback signal generating section 110 is output to a multiplexer (MUX) 113.

The MIMO switching section 112 selects the MIMO transmission scheme to use for transmission data #K, based on the CQIs, PMIs and RIs received as input from the channel quality measurement section 110. Then, the channel coding rate and modulation scheme for transmission data #K, to match the selected MIMO transmission scheme, are determined. The determined channel coding rate is output to the channel coding section 114, and the determined modulation scheme is output to the data modulation section 115.

Meanwhile, transmission data #K related to user #K, transmitted from a higher layer, is subjected to channel coding in the channel coding section 114, and, after that, subjected to data modulation in the data modulation section 115. Transmission data #K, having been subjected to data modulation in the data modulation section 115, is converted from a time sequence signal to a frequency domain signal in a serial-to-parallel conversion section, which is not shown, and output to a subcarrier mapping section 116.

The subcarrier mapping section 116 maps transmission data #K to subcarriers in accordance with schedule information that is designated from the radio base station 200. At this time, the subcarrier mapping section 116 maps (multiplexes) reference signal #K, having been generated in a reference signal generation section, which is not shown, to subcarriers, with transmission data #K. Transmission data #K, mapped to subcarriers in this way, is output to a precoding multiplication section 117.

The precoding multiplication section 117 applies a phase and/or amplitude shift to transmission data #K, for each of transmitting/receiving antenna TRX #1 to TRX #N. Then, the precoding multiplication section 117 applies the phase and/or amplitude shift in accordance with precoding weights that correspond to the PMIs that are designated by the control channel signals demodulated in the control channel demodulation section 108. Transmission data #K, having been subjected to a phase and/or amplitude shift by the precoding multiplication section 117, is output to the multiplexer (MUX) 113.

In the multiplexer (MUX) 113, transmission data #K, having been subjected to a phase and/or amplitude shift, and the control signals generated by the CSI feedback signal generating section 111, are combined, and transmission signals are generated for each of transmitting/receiving antennas TRX #1 to TRX #N. The transmission signals generated by the multiplexer (MUX) 113 are subjected to an inverse fast Fourier transform in inverse fast Fourier transform sections 118 #1 to 118 #N and converted from frequency domain signals to time domain signals, and, after that, attached CPs in CP adding sections 119 #1 to 119 #N and output to RF transmitting circuits 120 #1 to 120 #N. Then, a frequency conversion process to convert into a radio frequency band is performed in RF transmitting circuits 120 #1 to 120 #N, and, after that, output to transmitting/receiving antennas TRX #1 to TRX #N via duplexers 101 #1 to 101 #N, and output from transmitting/receiving antennas TRX #1 to TRX #N to the radio base station 200 on the uplink.

Now, although the present invention has been described in detail with reference to the above embodiments, it should be obvious to a person skilled in the art that the present invention is by no means limited to the embodiment described herein. For example, the number of users and the number of processing sections in the devices in the above embodiment are by no means limiting, and it is equally possible to change these as appropriate depending on device configurations. Also, the present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2011-177604, filed on Aug. 15, 2011, including the specification, drawings and abstract, is incorporated herein by reference in its entirety.

The invention claimed is:

1. A user terminal comprising:
   a receiving section configured to receive a plurality of reference signals transmitted by each of a plurality of groups;
   a channel quality measurement section configured to measure channel quality based on each of the reference signals;
   a feedback signal generating section configured to generate a feedback signal of at least one group of the plurality of groups; and
   a transmission section configured to transmit the feedback signal and an index of the at least one group,
   wherein the plurality of reference signals in each of the groups are allocated to a same resource in a plurality of antenna ports.

2. The user terminal according to claim 1, wherein reference signals transmitted by at least one group of the plurality of groups are allocated to a different resource from reference signals transmitted by other groups.

3. The user terminal according to claim 1, wherein the reference signals are channel state information reference signals.

4. A radio base station comprising:

a transmission section configured to transmit a plurality of reference signals by each of a plurality of groups;

precoding weight section configured to generate precoding weights for the respective groups; and a receiving section configured to receive an index of at least one group of the plurality of groups and a feedback signal of the at least one group, wherein the plurality of reference signals in each of the groups are allocated to a same resource in a plurality of antenna ports.

5. A radio communication system comprising: a radio base station and a user terminal that communicates with the radio base station, the user terminal comprising:
- a receiving section configured to receive a plurality of reference signals transmitted by each of a plurality of groups;
- a channel quality measurement section configured to measure channel quality based on each of the reference signals;
- a feedback signal generating section configured to generate a feedback signal of at least one of the plurality of groups; and
- a transmission section configured to transmit the feedback signal and an index of the at least one group, wherein the plurality of reference signals in each of the groups are allocated to a same resource in a plurality of antenna ports.

6. A radio communication method comprising the steps of:

receiving a plurality of reference signals transmitted by each of a plurality of groups;

measuring channel quality based on each of the reference signals;

generating a feedback signal of at least one group of the plurality of groups; and transmitting the feedback signal and an index of the at least one group, wherein the plurality of reference signals in each of the groups are allocated to a same resource in a plurality of antenna ports.

7. The user terminal according to claim 2, wherein the reference signals are channel state information reference signals.

* * * * *